US012341418B2

(12) United States Patent
Zhang et al.

(10) Patent No.: US 12,341,418 B2
(45) Date of Patent: Jun. 24, 2025

(54) CONTROL CIRCUIT AND METHOD FOR BUS VOLTAGE VARIATION IN POWER CONVERTERS

(71) Applicant: General Electric Company, Schenectady, NY (US)

(72) Inventors: Zheyu Zhang, Clifton Park, NY (US); Luca Tonini, Glenville, NY (US); Kenneth McClellan Rush, Ballston Spa, NY (US); Hao Tu, Raleigh, NC (US)

(73) Assignee: GE GRID SOLUTIONS LLC, Atlanta, GA (US)

( * ) Notice: Subject to any disclaimer, the term of this patent is extended or adjusted under 35 U.S.C. 154(b) by 287 days.

(21) Appl. No.: 17/596,957

(22) PCT Filed: Aug. 13, 2019

(86) PCT No.: PCT/US2019/046338
§ 371 (c)(1),
(2) Date: Dec. 22, 2021

(87) PCT Pub. No.: WO2020/263289
PCT Pub. Date: Dec. 30, 2020

(65) Prior Publication Data
US 2022/0231597 A1 Jul. 21, 2022

Related U.S. Application Data

(60) Provisional application No. 62/865,776, filed on Jun. 24, 2019.

(51) Int. Cl.
*H02M 1/32* (2007.01)
*H02M 1/00* (2007.01)

(52) U.S. Cl.
CPC ........... *H02M 1/32* (2013.01); *H02M 1/0022* (2021.05)

(58) Field of Classification Search
CPC ........ H02M 1/32; H02M 1/0022; H02H 3/44; H02H 3/20; H02H 3/08; H02H 3/10;
(Continued)

(56) References Cited

U.S. PATENT DOCUMENTS

| 8,344,550 B2 | 1/2013 | Delmerico et al. |
| 8,736,220 B2 | 5/2014 | Ogawa et al. |

(Continued)

FOREIGN PATENT DOCUMENTS

| CN | 204497747 U | 7/2015 | |
| DE | 102016121916 A1 * | 5/2017 | ............. H02M 1/32 |

(Continued)

OTHER PUBLICATIONS

Diaz-Franco, F. et al., "Low-voltage ride-through for PV systems using model predictive control approach." In 2016 North American Power Symposium (NAPS), pp. 1-6. IEEE, 2016.

(Continued)

*Primary Examiner* — Gustavo A Rosario-Benitez
(74) *Attorney, Agent, or Firm* — Armstrong Teasdale LLP

(57) ABSTRACT

A control circuit for a power converter is provided. The control circuit includes a pulse width modulator, a current feedback loop, a bus voltage feedforward path, and a logic circuit. The pulse width modulator generates a control signal for the power converter to regulate a load current. The current feedback loop controls the pulse width modulator to converge the load current to a demanded current. The bus voltage feedforward path measures a bus voltage supplied to the power converter at an input bus and, in combination with the current feedback loop, control the pulse width modulator to regulate the load current based on the bus voltage. The (Continued)

logic circuit collects load current measurements and determines, based at least partially thereon, a voltage variation event has occurred on the input bus, and disables the control signal for the power converter in response to determining the voltage variation event has occurred.

18 Claims, 5 Drawing Sheets

(58) Field of Classification Search
CPC ........ H02H 3/087; H02H 3/202; H02H 3/093; H02H 3/207; H02H 3/24; H02H 3/247
See application file for complete search history.

(56) References Cited

U.S. PATENT DOCUMENTS

| | | | |
|---|---|---|---|
| 9,941,702 B2 | 4/2018 | Abido et al. | |
| 2010/0039836 A1* | 2/2010 | Gong | H02M 3/156 363/21.13 |
| 2011/0032738 A1* | 2/2011 | Skinner | H02M 1/4208 363/126 |
| 2011/0122664 A1* | 5/2011 | Yabuzaki | H02M 1/32 363/53 |
| 2013/0141023 A1 | 6/2013 | Sugita | |
| 2016/0197545 A1* | 7/2016 | Nemoto | G01R 19/0092 363/78 |
| 2017/0063268 A1* | 3/2017 | da Silva | G05B 13/02 |
| 2017/0170745 A1* | 6/2017 | Wu | H02M 1/143 |
| 2018/0331625 A1 | 11/2018 | Somani et al. | |
| 2020/0076299 A1* | 3/2020 | Xue | H02M 3/158 |
| 2020/0091815 A1* | 3/2020 | Boncato | H02M 1/0025 |
| 2020/0119641 A1* | 4/2020 | Liang | H02M 3/157 |
| 2020/0235671 A1* | 7/2020 | Radic | H02M 3/33523 |

FOREIGN PATENT DOCUMENTS

| | | |
|---|---|---|
| EP | 2284986 A1 | 2/2011 |
| JP | 2000224890 A | 8/2000 |
| JP | 2013017390 A | 1/2013 |

OTHER PUBLICATIONS

Worku, M. et al., "Supercapacitor energy storage system for fault ride through in grid-connected PV array." In 2014 Saudi Arabia Smart Grid Conference (SASG), pp. 1-6. IEEE, 2014.
International Search Report and Written Opinion, PCT/US2019/046338, Mar. 18, 2020, 15 pages.

* cited by examiner

CONTROL CIRCUIT AND METHOD FOR BUS VOLTAGE VARIATION IN POWER CONVERTERS

CROSS REFERENCE TO RELATED APPLICATION

This application claims priority to U.S. Provisional Patent Application No. 62/865,776 filed on Jun. 24, 2019, naming Zheyu Zhang et al. as inventors, and titled "Control Circuit and Method for Bus Voltage Variation in Power Converters," the entire contents of which are hereby incorporated by reference herein.

BACKGROUND

The field of the disclosure relates generally to power converters and, more particularly, to a control circuit and method under bus voltage variation events in power converters.

Many known converter circuits, such as those in DC-DC converters, include multiple DC-DC converters coupled in parallel between a first bus and a second bus, or between an input bus and an output bus. The DC-DC converters generally include various switches, or switching circuits, controlled in a manner to produce a conversion from one DC level to another DC level, e.g., a buck-boost converter. In the alternative, at least some other converter circuits may similarly control switching to produce an AC to DC or a DC to AC conversion.

When an electrical event occurs on the input bus of a power converter, such as a transient voltage rise or other high dV/dt event, the converter may not detect the event quickly enough to moderate its control, e.g., feedback control or feedforward compensation, and, consequently, overcurrent protection may engage and disable the power converter. It would be desirable to improve high dV/dt event detection and response in power converters.

BRIEF DESCRIPTION

In one aspect, a control circuit for a power converter is provided. The control circuit includes a pulse width modulator, a current feedback loop, a bus voltage feedforward path, and a logic circuit. The pulse width modulator is configured to generate a control signal for the power converter to regulate a load current through the power converter. The current feedback loop is configured to control the pulse width modulator to converge the load current through the power converter to a demanded current. The bus voltage feedforward path is configured to measure a bus voltage supplied to the power converter at an input bus and, in combination with the current feedback loop, control the pulse width modulator to regulate the load current based on the bus voltage. The logic circuit is configured to collect load current measurements and determine, based at least partially thereon, a voltage variation event has occurred on the input bus. The logic circuit is configured to disable the control signal for the power converter in response to determining the voltage variation event has occurred.

In another aspect, a power converter is provided. The power converter includes an input bus, an output bus, a plurality of semiconductor switches, and a control circuit. The plurality of semiconductor switches is coupled between the input bus and the output bus. The plurality of semiconductor switches is configured to commutate at a switching frequency to regulate a load current from the input bus to the output bus. The control circuit is configured to control commutation of the plurality of semiconductor switches to converge the load current to a demanded current and regulate the load current based on a measured bus voltage at the input bus. The control circuit includes a logic circuit configured to collect load current measurements and determine, based at least partially thereon, a voltage variation event has occurred on the input bus, and disable a control signal for operating the plurality of semiconductor switches in response to determining the voltage variation event has occurred.

In yet another aspect a method of controlling a power converter during a bus voltage variation event is provided. The method includes generating a pulse width modulated (PWM) control signal for commutating a plurality of semiconductor switches of the power converter to converge a load current provided through the power converter to a demanded current. The method includes sampling a bus voltage supplied to the power converter at an input bus at a frequency of at least twice a switching frequency at which the plurality of semiconductor switches is commutated. The method includes modifying the PWM control signal based on the bus voltage to regulate the load current. The method includes collecting load current measurements and determining, based at least partially on the load current measurements, a voltage variation event has occurred on the input bus. The method includes disabling the PWM control signal for the power converter in response to determining the voltage variation event has occurred.

In at least some embodiments, the method further includes comparing the bus voltage to a subsequent bus voltage to determine a change in bus voltage over time, and re-enabling the PWM control signal for the power converter when the change in bus voltage over time falls below a voltage change threshold.

DRAWINGS

These and other features, aspects, and advantages of the present disclosure will become better understood when the following detailed description is read with reference to the accompanying drawings in which like characters represent like parts throughout the drawings, wherein.

Figure 1:
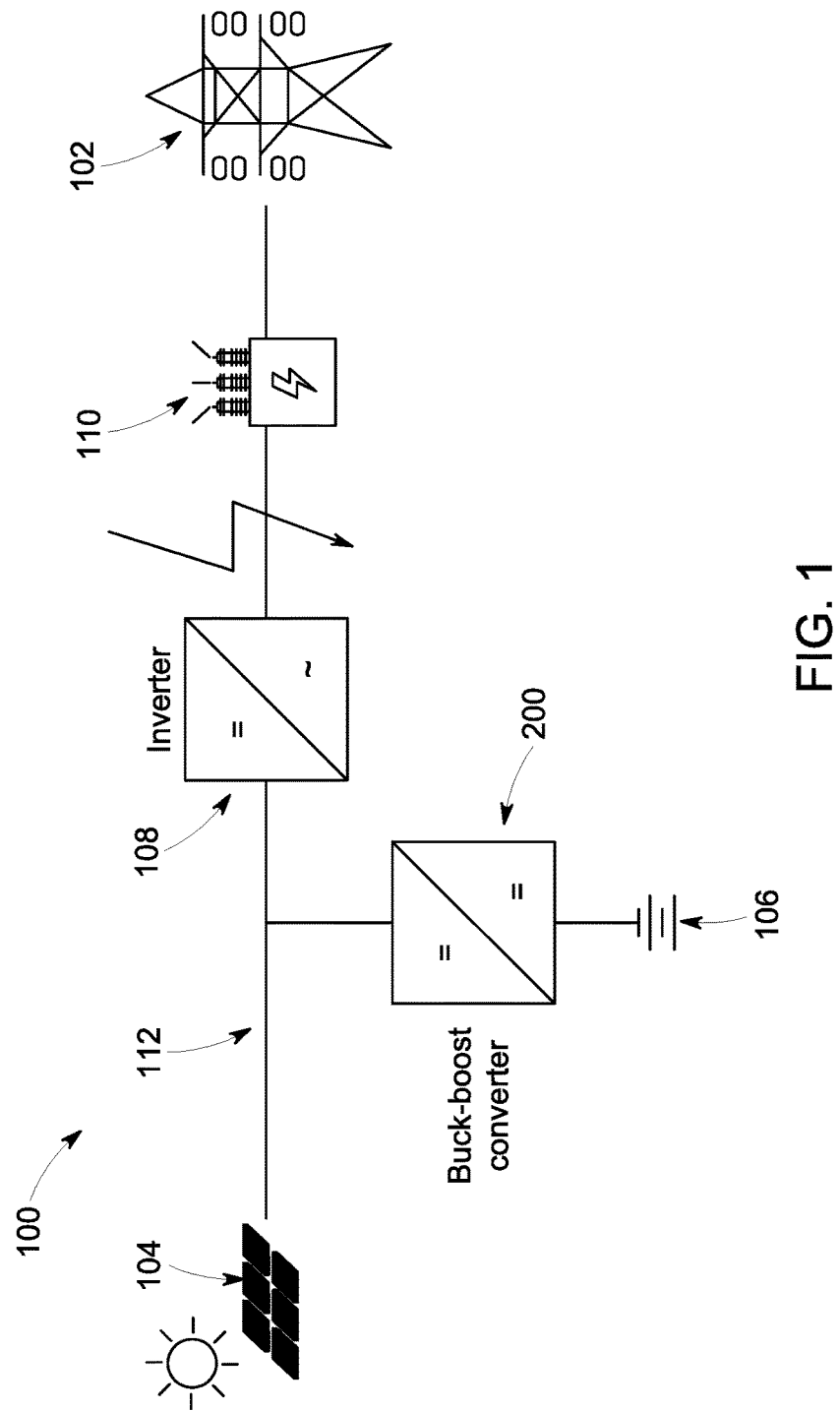
FIG. 1 is a schematic block diagram of an exemplary power system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it relates. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein. Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the present disclosure relate to a control circuit and method for a bus voltage variation event in a power converter. The control circuits and methods described herein improve the speed of detection of high dV/dt events by enabling high dI/dt detection as a leading indicator of the high dV/dt event, and by increasing the sensing frequency of bus voltage supplied to the power converter to enhance feedforward compensation and improve disturbance rejection capability of current control. Generally, current sensing, or detection, may be carried out at a significantly higher bandwidth than voltage sensing. For example, current sensing may be carried out at a frequency above a switching frequency for the semiconductor switches of the power converter. More specifically, in certain embodiments, current sensing may be carried out at a bandwidth of ten-times the switching frequency.

FIG. 1 is a schematic block diagram of an exemplary power system 100. Power system 100 includes an electric grid 102 that can be supplied power from, for example, a photovoltaic (PV) string 104 or a battery 106, or any other suitable renewable or non-renewable energy source. Generally, electric grid 102 is an alternating current (AC) grid operating at various voltage levels for the purpose of power transmission. Accordingly, power supplied, for example, by PV string 104 or battery 106 is converted to line-frequency power by an inverter 108 and, typically, stepped up by a transformer 110. In alternative embodiments, transformer 110 may step down the AC voltage to suit a given distribution line within electric grid 102.

PV string 104 produces DC power at a nominal direct current (DC) voltage for a DC bus 112 that connects PV string 104 to inverter 108. This nominal DC voltage at which DC bus 112 operates is referred to as the bus voltage. Likewise, battery 106, or any other energy storage device, produces DC power at an operating voltage for battery 106, which is then converted to the bus voltage by a power converter 200, such as a buck-boost converter. Power converter 200 converts DC power sourced by battery 106 from the operating voltage to the bus voltage on DC bus 112 when supplying power to inverter 108 and electric grid 102, or any other electrical load. Conversely, when battery 106 is not supplying power to inverter 108 and electric grid 102, battery 106 may be charged from DC bus 112. In such a scenario, power converter 200 converts DC power from the bus voltage on DC bus 112 to the operating voltage for battery 106 to charge battery 106.

Power system 100 may occasionally experience a voltage variation event, such as a grid fault. When this occurs, inverter 108 no longer delivers active power, resulting in a power imbalance on DC bus 112, because PV string 104 continues supplying power based on the current bus voltage on DC bus 112. Accordingly, the bus voltage on DC bus 112 increases rapidly until it approaches an open circuit voltage of PV string 104, and may lead to a transient high dV/dt event, e.g., a voltage increase of up to 200 Volts per millisecond (V/ms). Under certain circumstances, where the additional power is not supplied through inverter 108 to electric grid 102, the increase in bus voltage presents to power converter 200 and, potentially, battery 106 as a bus voltage variation event.

Figure 2:
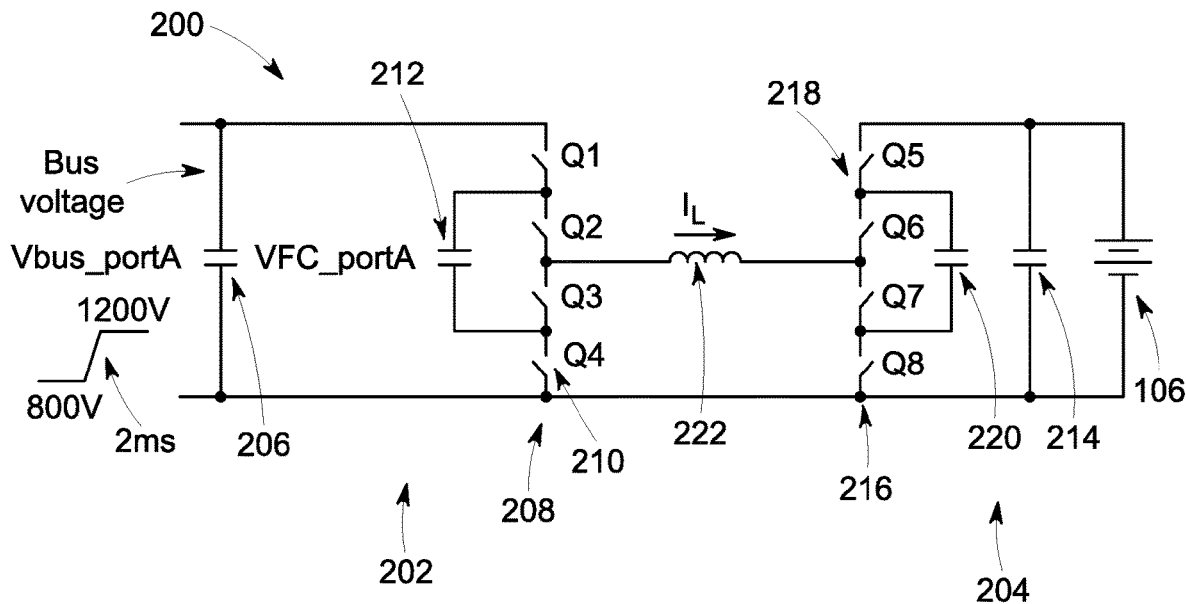
FIG. 2 is a schematic diagram an exemplary power converter for use in the power system shown in FIG. 1.

FIG. 2 is a schematic diagram of an exemplary power converter 200 for use in power system 100 shown in FIG. 1. Power converter 200 is one example of power converter architecture and, more specifically, is illustrated as a flying capacitor power converter. Power converter 200 includes an input bus, or bus side 202, and an output bus, or battery side 204. Bus side 202 is configured to be coupled to DC bus 112 (shown in FIG. 1) and is, accordingly, supplied the bus voltage, which is applied across a bus capacitor 206 and a switching circuit 208, including a plurality of semiconductor switches 210 and a flying capacitor 212. Battery side 204 is coupled to battery 106 and provides a battery voltage across an output capacitor 214. Battery side 204 includes a switching circuit 216, including a plurality of semiconductor switches 218 and a flying capacitor 220. Generally, semiconductor switches 210 and 218 are controlled by a processor (not shown) according to one or more pulse width modulated (PWM) control signals to affect the conversion from the bus voltage to the battery voltage, or from the battery voltage to the bus voltage. Power converter 200 includes an inductor 222 spanning between bus side 202 and battery side 204, and functions to stabilize current ($I_L$) through power converter 200, i.e., provides a desired substantially constant current.

When power system 100, for example, experiences a voltage variation event, control of semiconductor switches 210 and 218 is modified to control the current ($I_L$) through power converter 200. If current ($I_L$) is not moderated properly, an over-current protection may engage and disable power converter 200. Such moderating is traditionally achieved by monitoring the bus voltage on DC bus 112 and using a feedforward control loop together with a current feedback control loop, implemented in a processor, for example, to moderate current ($I_L$) through power converter 200 by adjusting the PWM control signals that control semiconductor switches 210 and 218. However, such traditional protection generally is delayed and may result in engaging the over-current protection for power converter 200.

Figure 3:
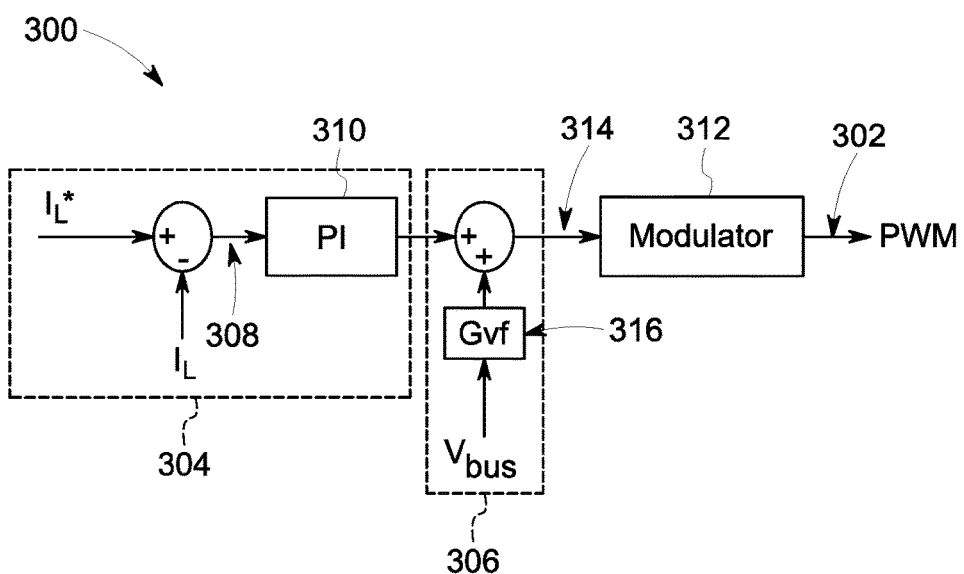
FIG. 3 is a schematic diagram of a known control circuit for a power converter.

FIG. 3 is a schematic diagram of a known control circuit 300 for a power converter, such as power converter 200 (shown in FIG. 2). Generally, control circuit 300 produces a PWM control signal 302 for controlling the various semiconductor switches in the power converter. Control circuit 300 uses measured current ($I_L$) and measured bus voltage ($F_{bus}$) to make adjustments to the PWM control signal 302 over time, which will eventually converge on, for example, a demanded current ($I_L^*$). Control circuit 300 responds to changes in demanded current ($I_L^*$) and small variations in bus voltage ($V_{bus}$) over a given period of time by further adjusting the PWM control signal 302 and converging on a new level of output, or current ($I_L$). However, when, for example, the bus voltage ($V_{bus}$) increases rapidly, e.g., 200 V/ms, control circuit 300 typically does not detect and respond (e.g., reduce current throughput) quickly enough to avoid engaging over-current control and disabling the power converter.

Control circuit 300 embodies the control functionality in a current feedback loop 304 and a bus voltage feedforward path 306. Current feedback loop 304 computes a current error 308 that is a difference between demanded current ($I_L^*$) and actual, or measured, current ($I_L$). Current feedback loop 304 also includes a proportional-integral (PI) controller 310 that aims to minimize the current error 308 and produces an output signal that is modulated by a PWM modulator 312 to produce the PWM control signal 302. Bus voltage feedforward path 306 utilizes a measured bus voltage ($V_{bus}$) on, for example, DC bus 112, to adjust a duty cycle signal 314 representing a duty cycle at which PWM modulator 312 is to generate PWM control signal 302. The measured bus voltage ($V_{bus}$) is generally gained 316 before being combined with the output signal of PI controller 310 to produce the duty cycle signal 314. Generally, the detection of a high dV/dt event by bus voltage feedforward path 306 is too delayed to properly moderate duty cycle signal 314 and, therefore, PWM control signal 302, resulting in a potential over-current in the power converter as a result of the high dV/dt event.

Figure 4:
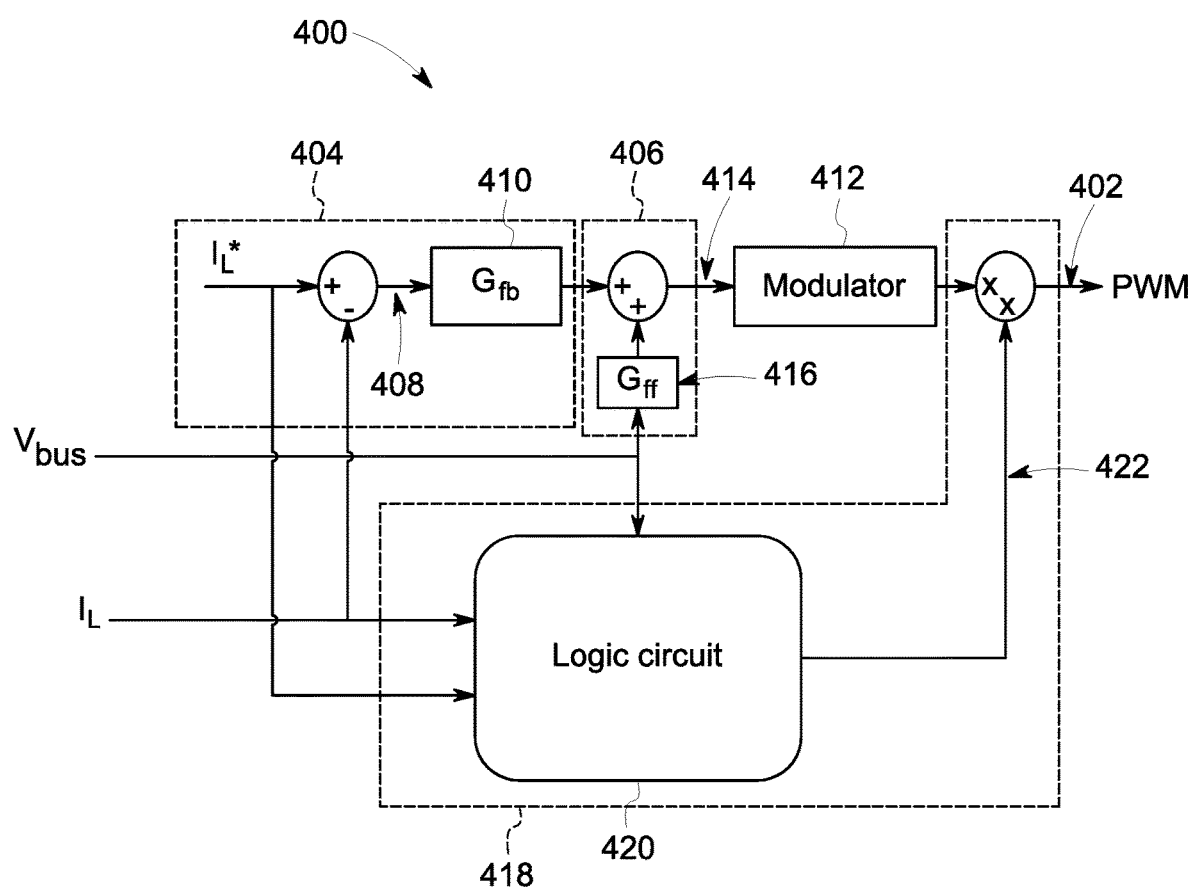
FIG. 4 is a schematic diagram of a control circuit for the power converter shown in FIG. 2.

FIG. 4 is a schematic diagram of an exemplary control circuit 400 disclosed herein for power converter 200 shown in FIG. 2. Control circuit 400 may be embodied in one or more processors or other suitable processing device. Generally, control circuit 400 produces a PWM control signal 402 for controlling the various semiconductor switches in power converter 200. Control circuit 400, like control circuit 300 (shown in FIG. 3) uses measured current ($I_L$) and measured bus voltage ($V_{bus}$) to make adjustments to the PWM control signal 402 over time, which will eventually converge on, for example, a demanded current ($I_L^*$). In contrast to control circuit 300 of FIG. 3, control circuit 400 utilizes both bus voltage feedforward control and current monitoring to provide fast-response protection in control circuit 400 in the event of a high dV/dt event in power converter 200, and, in certain embodiments, enables restart of power converter 200 when the voltage variation subsides. Current monitoring, or current sensing, enables fast-response protection by carrying out current measurements at a frequency of at least the switching frequency and, in certain embodiments, for example, at a frequency of ten-times the switching frequency of the semiconductor switches.

Control circuit 400 includes a current feedback loop 404 and a bus voltage feedforward path 406. Current feedback loop 404 computes a current error 408 that is a difference between a demanded current ($I_L^*$) for power converter 200 and the actual current ($I_L$) through power converter 200. Feedback loop 404 includes, in certain embodiments, for example, a PI controller 410 that aims to minimize the current error 408 and produces an output signal that is modulated by a PWM modulator 412 to produce PWM control signal 402 for one or more of semiconductor switches 210 and 218 of power converter 200. PI controller 410 should generally have a high gain ($G_{fb}$). For example, in certain embodiments, the gain ($G_{fb}$) of PI controller 410 is at least 20 dB in the frequency range at which the voltage variation event occurs, e.g., around 200 Hz.

Bus voltage feedforward path 406 utilizes a measured bus voltage ($V_{bus}$) on DC bus 112 (shown in FIG. 1) to adjust a duty cycle signal 414 representing a duty cycle at which PWM modulator 412 is to generate PWM control signal 402. The measured bus voltage ($V_{bus}$) is generally gained 416 (e.g., with a gain of $G_{ff}$) before being combined with the output signal of PI controller 410 to produce the duty cycle signal 414. Bus voltage feedforward path 406 should have a high bandwidth, e.g., at least 1000 Hz, and a high sampling rate to reduce lag in the feedforward response through control circuit 400. The sampling rate, or sampling frequency, in certain embodiments, for bus voltage feedforward path 406 should be several times the frequency at which semiconductor switches 210 and 218 are switched. For example, in certain embodiments, where the switching frequency is about 30 KHz, the sampling frequency for bus voltage feedforward path 406 should be at least 240 KHz. If bus voltage feedforward path 406 detects a voltage variation event, its output will result in an adjustment of PWM control signal 402 generated by control circuit 400, and a corresponding regulation of current ($I_L$) through power converter 200.

Control circuit 400 includes a fast-response protection path 418 that includes a logic circuit 420 for monitoring current ($I_L$) through power converter 200 for rapid changes, resulting in a fast-response current control signal 422 that is applied directly to PWM control signal 402 to enable/disable PWM control signal 402. Generally, because the current sensing bandwidth is higher than voltage sensing bandwidth, current sensing enables monitoring of current ($I_L$) through power converter 200 to be a leading indicator of a voltage variation event. Current monitoring further enables improvement in the response rate at which control circuit 400 can operate. In one embodiment, logic circuit 420 evaluates the measured current ($I_L$) through power converter 200 in a series of logical evaluations in the context of demanded current ($I_L^*$) and the bus voltage on DC bus 112 (shown in FIG. 1). More specifically, in one embodiment, the current error 408 is computed and compared to a current error threshold. If current error exceeds a threshold, logic circuit 420 proceeds to a second evaluation of whether the current error is, for example, increasing. If the current error is increasing over time, logic circuit 420 proceeds to a third evaluation of whether the demanded current ($I_L^*$) is changing in a manner, e.g., rapidly, such that it would account for the significant change in current error over time. If the change in demanded current ($I_L^*$) is below a demanded current change threshold (i.e., the change in measured current ($I_L$) is not due to a change in demanded current ($I_L^*$)), then fast-response current control signal 422 operates to disable PWM control signal 412 and, consequently, the output of power converter 200.

Logic circuit 420, in certain embodiments, may further include a restart logical evaluation to enable the PWM control signal 402 when the bus voltage stabilizes. In such embodiments, logic circuit 420 evaluates whether the change in bus voltage over time, positive or negative, falls below a voltage change threshold for restarting, or re-enabling, power converter 200.

The above described logical evaluation in logic circuit 420 is only one example of the one or more logical tests that may be incorporated into logic circuit 420 for the purpose of producing fast-response current control signal 422. Likewise, the current error threshold, the demanded current change threshold, and the voltage change threshold may be customized for a given power converter 200 and application, such as power system 100.

Figure 5:
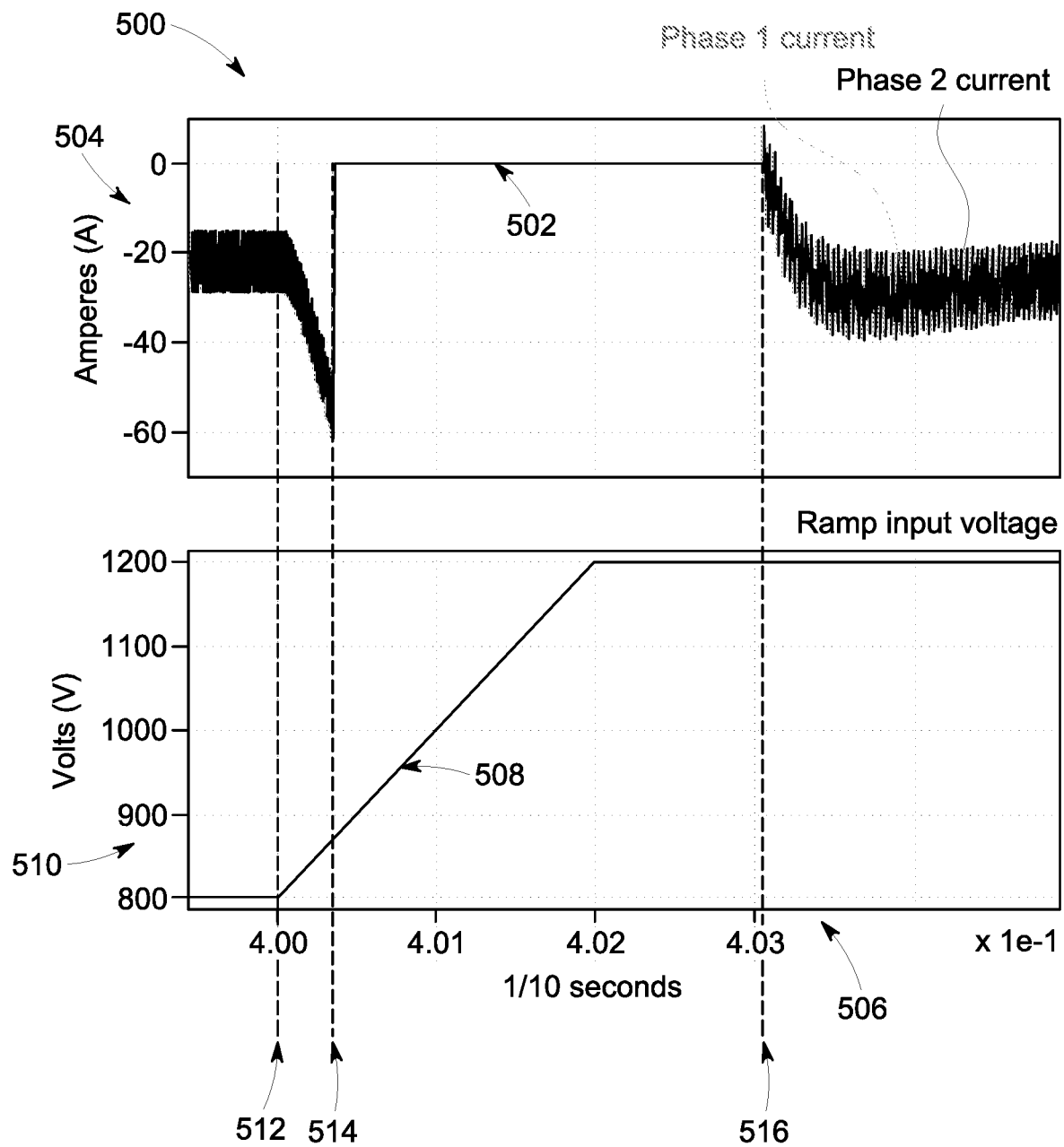
FIG. 5 is a plot of voltage and current in a power converter from a simulation illustrating a method of using the control circuit shown in FIG. 4 during a voltage variation event.

FIG. 5 is a plot 500 of voltage and current in a power converter, such as power converter 200 (shown in FIG. 2) from a simulation illustrating a method of using control circuit 400 (shown in FIG. 4) during a voltage variation event. Plot 500 includes current plots 502 for a PHASE 1 and a PHASE 2 (shown in light and dark grey, respectively) in power converter 200. Current plots 502 illustrate current expressed in amperes (A) along a vertical axis 504 versus time expressed in tenths of a second (tenths) along a horizontal axis 506. Current ranges from just above 0 A to just below −60 A. Time ranges from just before 4.00 tenths to about 4.03 tenths. Plot 500 also includes a bus voltage plot 508 illustrating a high dV/dt event experienced on DC bus 112 (shown in FIG. 1). Bus voltage plot 508 illustrates voltage expressed in volts (V) along a vertical axis 510 versus time (tenths) on horizontal axis 506. Voltage ranges from about 800 V to about 1200 V.

Plot 500 illustrates the occurrence of a high dV/dt event at a time of approximately 4.00 tenths, shown by a first vertical marker 512, or dashed line. During a first period of time between first vertical marker 512 and a second vertical marker 514, current feedback loop 404 and bus voltage feedforward path 406 combine to detect the change in bus voltage and attempt to restrict the current throughput of power converter 200, illustrated by PHASE 1 and PHASE 2 current plots 502, which is increasing rapidly with the voltage ramp illustrated in bus voltage plot 508 from a demanded current value (about −20 A). At a time corresponding to second vertical marker 514 (about 300 microseconds after the high dV/dt event began), fast-response protection path 418 detects the high dV/dt event using current monitoring and logic circuit 420, resulting in a disabling of current output by power converter 200. The disabling is illustrated by a sharp reduction of PHASE 1 and PHASE 2 currents to 0 A in current plots 502. At a third vertical marker 516 (about 3 ms after the high dV/dt event began), fast-response protection path 418 determines, based on the sensed bus voltage, the high dV/dt event has lapsed and current output by power converter 200 may be restarted, although the bus voltage itself is much higher (about 1200 V) than before the high dV/dt event. The restarting of current output from power converter 200 is illustrated in current plots 502 re-converging on the prior demanded current value (about −20 A).

Figure 6:
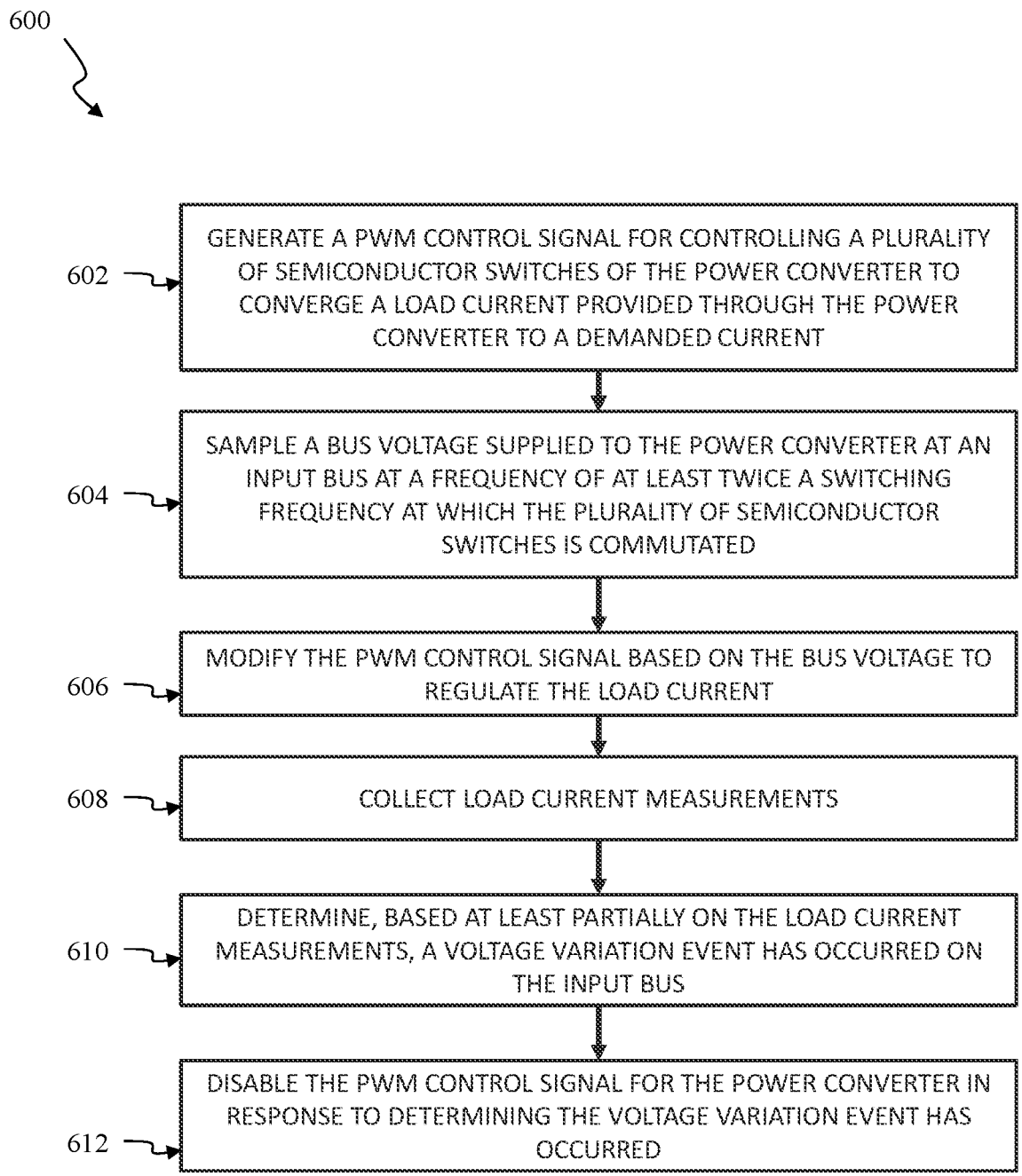
FIG. 6 is a flow diagram of an example method of controlling a power converter.

FIG. 6 is a flow diagram of a method 600 of controlling power converter 200 (shown in FIGS. 1 and 2) during a bus voltage variation event using, for example, control circuit 400 (shown in FIG. 4). The method includes generating 602 PWM control signal 402 for commutating a plurality of semiconductor switches 210 and 218 of power converter 200 to converge a load current provided through power converter 200 to a demanded current. The bus voltage supplied to power converter 200 at input bus 202 is sampled 604 at a frequency of at least twice a switching frequency at which semiconductor switches 210 and 218 are commutated. PWM control signal 402 is modified 606 based on the bus voltage to regulate the load current. Control circuit 400 collects 608 load current measurements and then determines 610, using logic circuit 420 based at least partially on the load current measurements, a voltage variation event has occurred on input bus 202. In response, control circuit 400 disables 612 PWM control signal 402 for power converter 200.

In at least some embodiments, method 600 further includes comparing, by logic circuit 420, the bus voltage to a subsequent bus voltage to determine a change in bus voltage over time, and re-enabling PWM control signal 402 for power converter 200 when the change in bus voltage over time falls below a voltage change threshold.

The above described embodiments of a control circuit and method under a bus voltage variation event for a power converter. The control circuits and methods described herein improve the speed of detection of high dV/dt events by enabling high dI/dt detection as a leading indicator of the high dV/dt event, and by increasing the sensing frequency of bus voltage supplied to the power converter to enhance feedforward compensation and improve disturbance rejection capability of current control.

An exemplary technical effect of the methods, systems, and apparatus described herein includes at least one of: (a) improving detection of high dV/dt events on an input bus for a power converter; (b) utilizing high dI/dt detection as a leading indicator for a high dV/dt event; (c) improving speed of feedforward compensation of power conversion to the output bus of the power converter; (d) enabling restart to resume normal operation after the high dV/dt event.

Exemplary embodiments of methods, systems, and apparatus for switching circuits are not limited to the specific embodiments described herein, but rather, components of systems and/or steps of the methods may be utilized independently and separately from other components and/or steps described herein. For example, the methods may also be used in combination with other non-conventional switching circuits, and are not limited to practice with only the systems and methods as described herein. Rather, the exemplary embodiment can be implemented and utilized in connection with many other applications, equipment, and systems that may benefit from reduced cost, reduced complexity, commercial availability, improved manufacturability, and reduced product time-to-market.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control circuit for a power converter, said control circuit comprising:
    a pulse width modulator configured to generate a control signal for the power converter to regulate a load current through the power converter;
    a current feedback loop configured to control said pulse width modulator to converge the load current through the power converter to a demanded current;
    a bus voltage feedforward path configured to measure a bus voltage supplied to the power converter at an input bus and, in combination with said current feedback loop, control said pulse width modulator to regulate the load current based on the bus voltage; and
    a logic circuit configured to:
        collect load current measurements;
        compute a current error that is compared to a current error threshold, the current error being equal to a difference between a most recent one of the load current measurements and the demanded current;
        determine, based at least partially on the current error exceeding the current error threshold, that a voltage variation event has occurred on the input bus; and
        disable the control signal for the power converter in response to determining the voltage variation event has occurred.

2. The control circuit of claim 1, wherein said logic circuit is further configured to perform a logical comparison to determine the current error signal is increasing over time, and wherein said logic circuit is further configured to determine the voltage variation event has occurred based on the increasing current error signal.

3. The control circuit of claim 1, wherein said logic circuit is further configured to perform a first logical comparison of the demanded current over time to determine a rate of change in the demanded current, and is further configured to perform a second logical comparison of the rate of change in the demanded current to a demanded current change threshold, and wherein said logic circuit is further configured to determine the voltage variation event has occurred based on the rate of change being less than the demanded current change threshold.

4. The control circuit of claim 3, wherein said logic circuit is further configured to perform:
    a third logical comparison of a current error signal to the current error threshold, and wherein said logic circuit is further configured to determine the voltage variation event has occurred based on the third logical comparison; and
    a fourth logical comparison of the current error signal to a subsequent current error signal to determine the current error signal is increasing over time, and wherein said logic circuit is further configured to determine the voltage variation event has occurred based on the increasing current error signal.

5. The control circuit of claim 1, wherein said logic circuit is further configured to perform a logical comparison of the bus voltage to a subsequent bus voltage to determine a change in the bus voltage over time, said logic circuit further configured to re-enable the control signal for the power converter when the change in the bus voltage over time falls below a voltage change threshold.

6. The control circuit of claim 1, wherein said bus voltage feedforward path is further configured to sample the bus voltage at a frequency of at least twice a switching frequency at which the power converter is operated.

7. A power converter, comprising:
    an input bus;
    an output bus;
    a plurality of semiconductor switches coupled between said input bus and said output bus, said plurality of semiconductor switches configured to commutate at a switching frequency to regulate a load current from said input bus to said output bus; and
    a control circuit configured to control said plurality of semiconductor switches to converge the load current to a demanded current and regulate the load current based on a bus voltage at said input bus, said control circuit comprising a logic circuit configured to:
    collect load current measurements;
    compute a current error that is compared to a current error threshold, the current error being equal to a difference between a most recent one of the load current measurements and the demanded current;
    determine, based at least partially on the current error exceeding the current error threshold, that a voltage variation event has occurred on said input bus; and
    disable a control signal for operating said plurality of semiconductor switches in response to determining the voltage variation event has occurred.

8. The power converter of claim 7, wherein said control circuit comprises a high-frequency bus voltage feedforward path configured to sample the bus voltage at a frequency of at least twice the switching frequency of said plurality of semiconductor switches.

9. The power converter of claim 7, wherein said control circuit comprises a current feedback loop configured to control a pulse width modulator to converge the load current through said power converter to the demanded current.

10. The power converter of claim 9, wherein said current feedback loop comprises a proportional-integral (PI) controller having a gain of at least 20 decibels at operating frequencies below 1000 hertz.

11. The power converter of claim 7, wherein said plurality of semiconductor switches is configured to commutate to convert a first direct current (DC) bus voltage supplied to said input bus to a second DC bus voltage produced on said output bus.

12. The power converter of claim 7, wherein said logic circuit is further configured to perform a logical comparison of the bus voltage to a subsequent bus voltage to determine a change in the bus voltage over time, said logic circuit further configured to re-enable the control signal for the power converter when the change in the bus voltage over time falls below a voltage change threshold.

13. A method of controlling a power converter during a bus voltage variation event, said method comprising:
  generating a pulse width modulated (PWM) control signal for controlling a plurality of semiconductor switches of the power converter to converge a load current provided through the power converter to a demanded current;
  sampling a bus voltage supplied to the power converter at an input bus at a frequency of at least twice a switching frequency at which the plurality of semiconductor switches is commutated;
  modifying the PWM control signal based on the bus voltage to regulate the load current;
  collecting load current measurements;
  computing a current error that is compared to a current error threshold, the current error being equal to a difference between a most recent one of the load current measurements and the demanded current;
  determining, based at least partially on the current error exceeding the current error threshold, that a voltage variation event has occurred on the input bus; and
  disabling the PWM control signal for the power converter in response to determining the voltage variation event has occurred.

14. The method of claim 13 further comprising sampling the load current and modifying the PWM control signal using a proportional-integral (PI) current feedback loop.

15. The method of claim 13, wherein determining the voltage variation event has occurred comprises:
  determining the current error signal is increasing over time; and
  determining the voltage variation event has occurred based on the increasing current error signal.

16. The method of claim 13, wherein determining the voltage variation event has occurred comprises:
  comparing the demanded current over time to determine a rate of change in the demanded current;
  comparing the rate of change in the demanded current to a demanded current change threshold; and
  determining the voltage variation event has occurred based on the rate of change being less than the demanded current change threshold.

17. The method of claim 13, wherein determining the voltage variation event has occurred further comprises:
  comparing a current error signal to the current error threshold;
  comparing the current error signal to a subsequent current error signal to determine the current error signal is increasing over time;
  comparing the demanded current over time to determine a rate of change in the demanded current;
  comparing the rate of change in the demanded current to a demanded current change threshold; and
  determining the voltage variation event has occurred based on the current error signal exceeding the current error threshold, the increasing current error signal, and the rate of change being less than the demanded current change threshold.

18. The method of claim 13 further comprising:
  comparing the bus voltage to a subsequent bus voltage to determine a change in the bus voltage over time; and
  re-enabling the PWM control signal for the power converter when the change in the bus voltage over time falls below a voltage change threshold.

* * * * *